United States Patent [19]
Yoshida

[11] Patent Number: 5,410,620
[45] Date of Patent: Apr. 25, 1995

[54] DIGITAL DATA READER OF DIGITAL DATA RECORDING SHEET

[75] Inventor: Hirokazu Yoshida, Osaka, Japan

[73] Assignee: Teiryo Sangyo Co., Ltd., Osaka, Japan

[21] Appl. No.: 15,087

[22] Filed: Feb. 9, 1993

Related U.S. Application Data

[63] Continuation of Ser. No. 651,385, Mar. 7, 1991, abandoned.

[30] Foreign Application Priority Data

Aug. 2, 1989 [JP] Japan ................... 1-200467

[51] Int. Cl.$^6$ .............................................. G06K 9/32
[52] U.S. Cl. ........................................ 382/61; 382/46; 235/494; 235/495; 358/486
[58] Field of Search .............. 382/61, 46, 44, 45; 358/470, 486, 488; 235/494, 495, 456; 395/117, 137

[56] References Cited

U.S. PATENT DOCUMENTS

| | | | |
|---|---|---|---|
| 4,300,123 | 11/1981 | McMillin et al. | 382/61 |
| 4,403,339 | 9/1983 | Wevelsiep et al. | 382/61 |
| 4,924,078 | 5/1990 | Sant'Anselmo et al. | 235/494 |
| 4,939,354 | 7/1990 | Priddy et al. | 235/494 |
| 5,023,923 | 6/1991 | Sanner et al. | 382/61 |
| 5,101,096 | 3/1992 | Ohyama et al. | 235/494 |
| 5,128,526 | 7/1992 | Yoshida | 235/456 |
| 5,204,515 | 4/1993 | Yoshida | 382/61 |

FOREIGN PATENT DOCUMENTS

| | | |
|---|---|---|
| 0299383 | 1/1989 | European Pat. Off. . |
| 61-72371 | 4/1986 | Japan . |
| 64-76176 | 3/1989 | Japan . |

*Primary Examiner*—Joseph Mancuso
*Assistant Examiner*—Steven P. Klocinski

[57] ABSTRACT

A system and method for locating and reading digital data in data regions within a data field disposed on a surface of an object to be identified include the capability of compensating for optical or physical distortions of the data field as viewed by an optical reader. The data field is defined by X-axis and Y-axis intersecting basic lines disposed at a predetermined angle with respect to each other and a corner mark disposed on the opposite side of the data field from those basic lines. A plurality of positions marks for marking predetermined distances between a plurality of imaginary X and Y axis internal lines are also provided. The positions of the imaginary X-axis internal lines within the data field are determinable from their spacings and angles with respect to the Y-axis basic line. The positions of the imaginary Y-axis internal lines are determinable from their spacings and their angles with respect to the X-axis basic line. The location of the points of intersection of the imaginary X and Y axis internal lines are calculated in order to define data regions within the data field. The system and method compensate for optical and physical distortions of the locations of the X and Y axis basic lines, corner mark and position marks at the time of reading the data in order to accurately locate positions of the data regions within the data field.

18 Claims, 10 Drawing Sheets

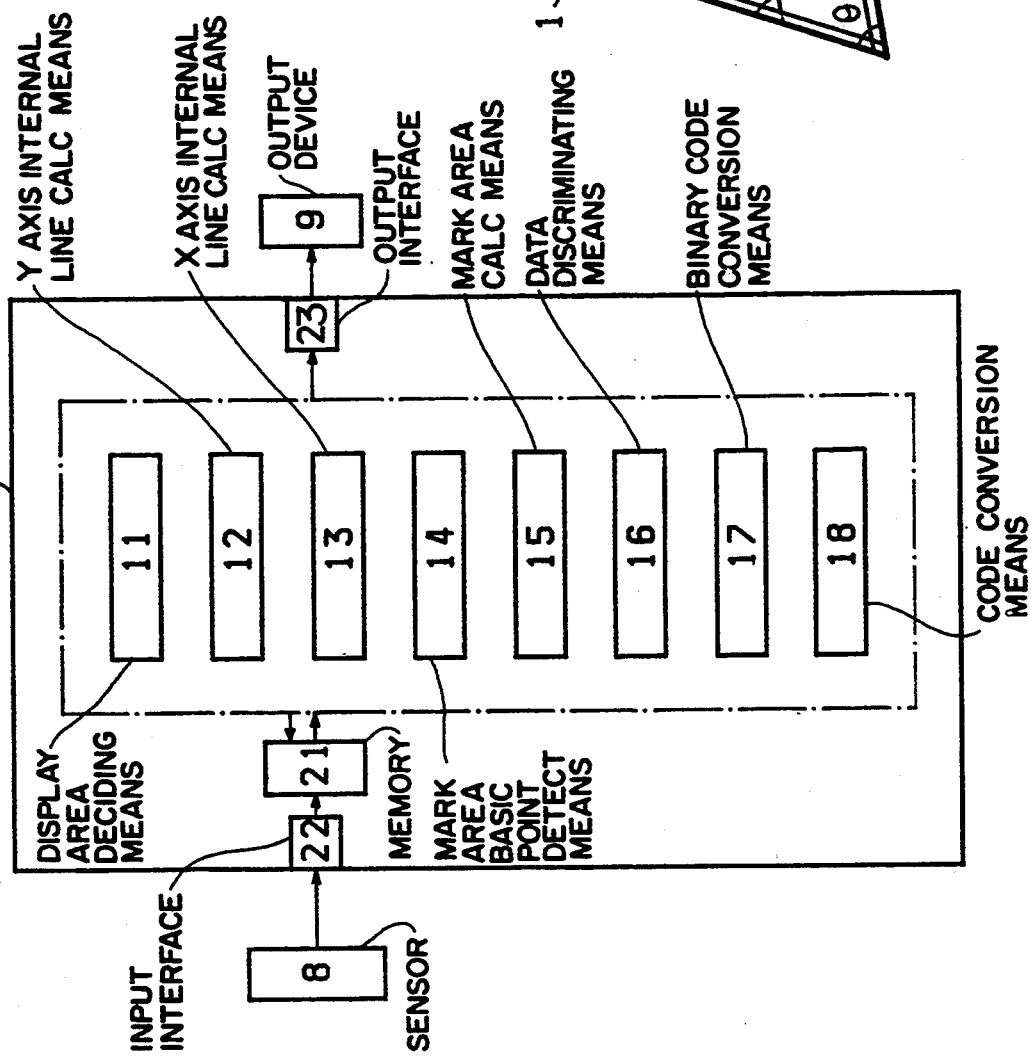

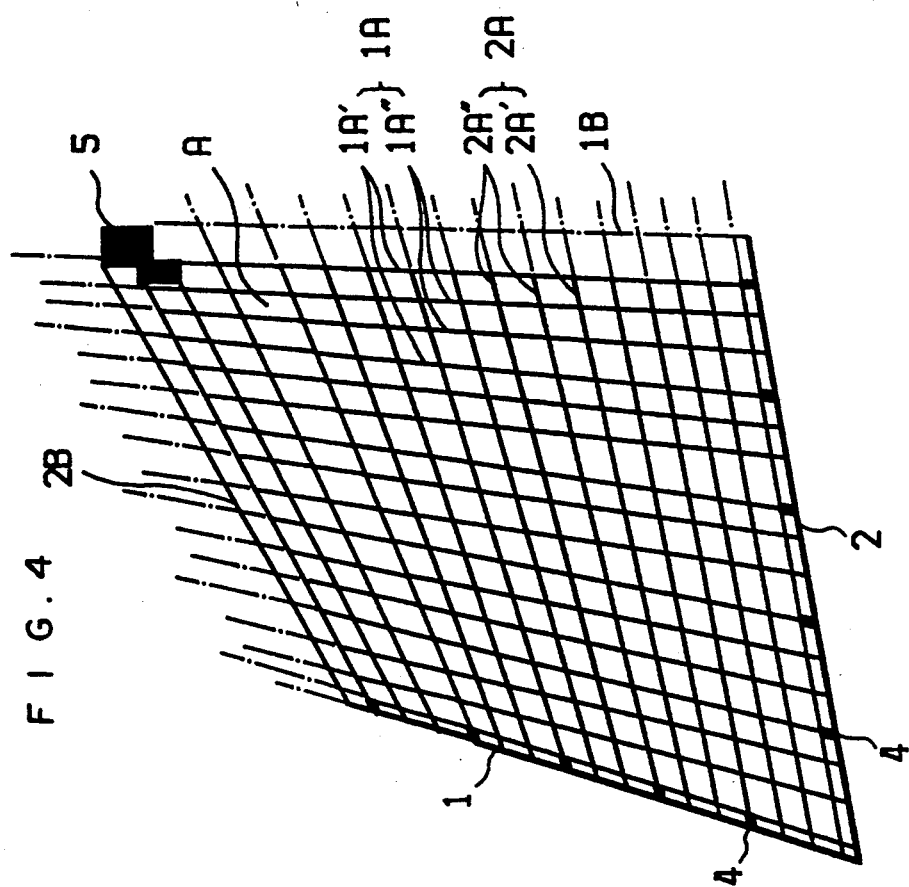
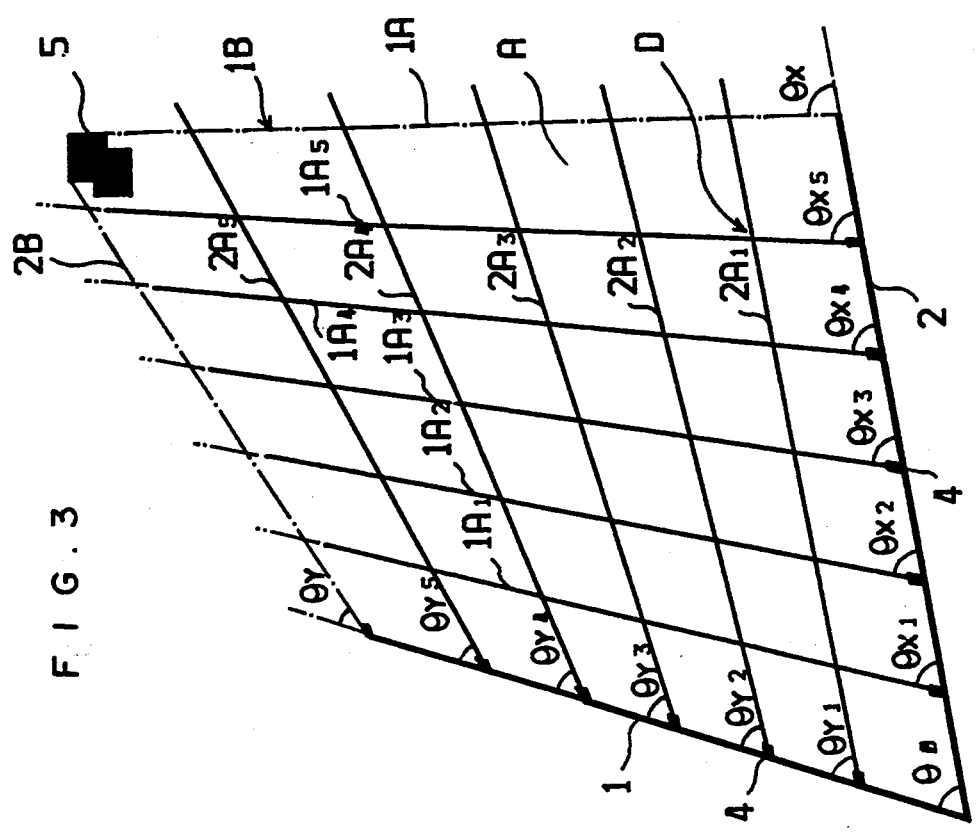

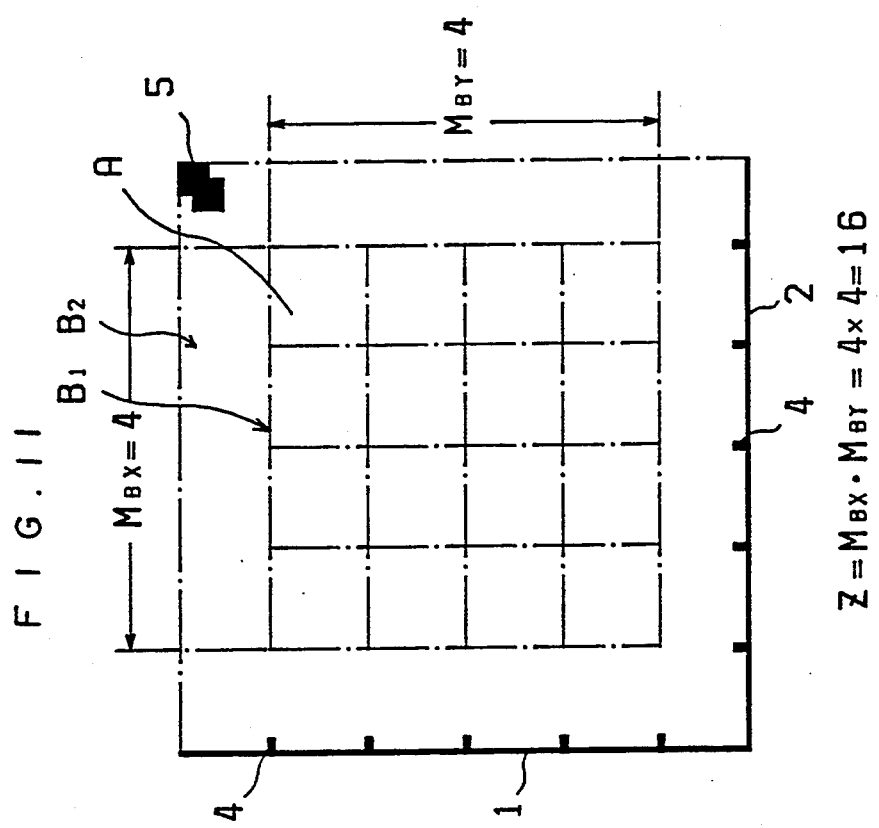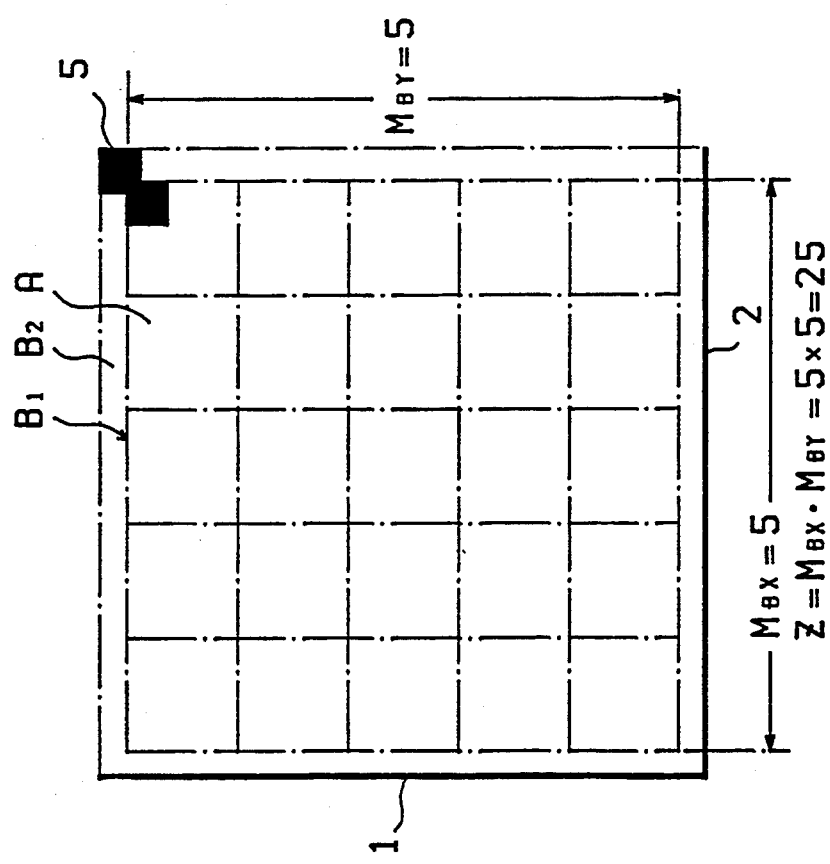

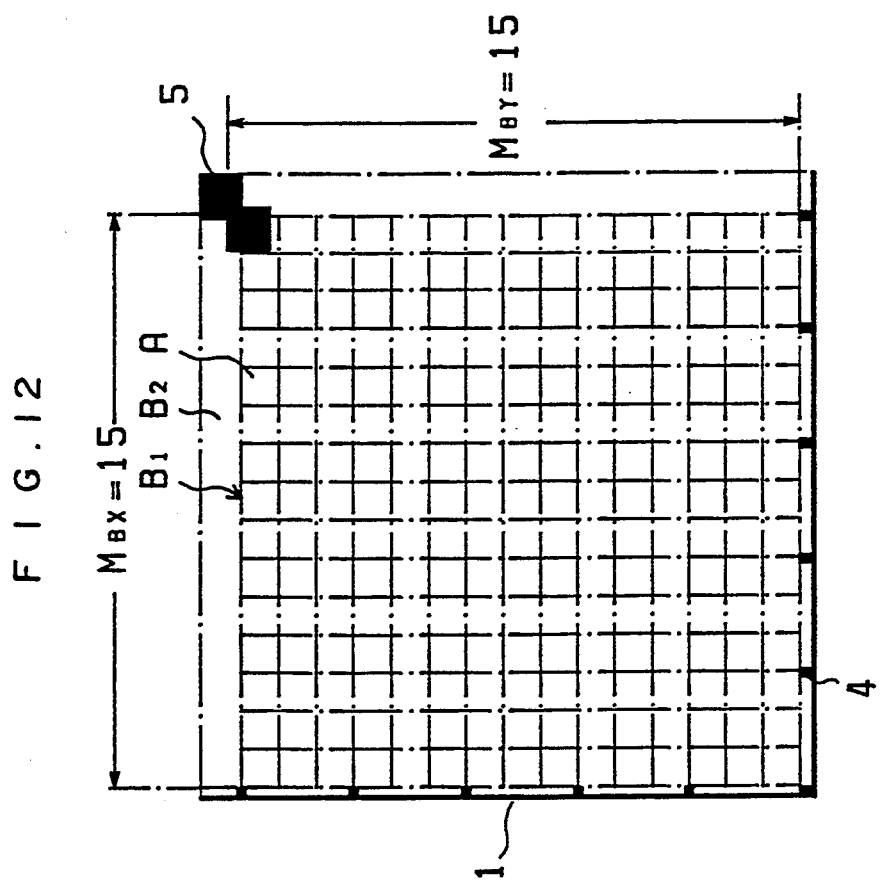

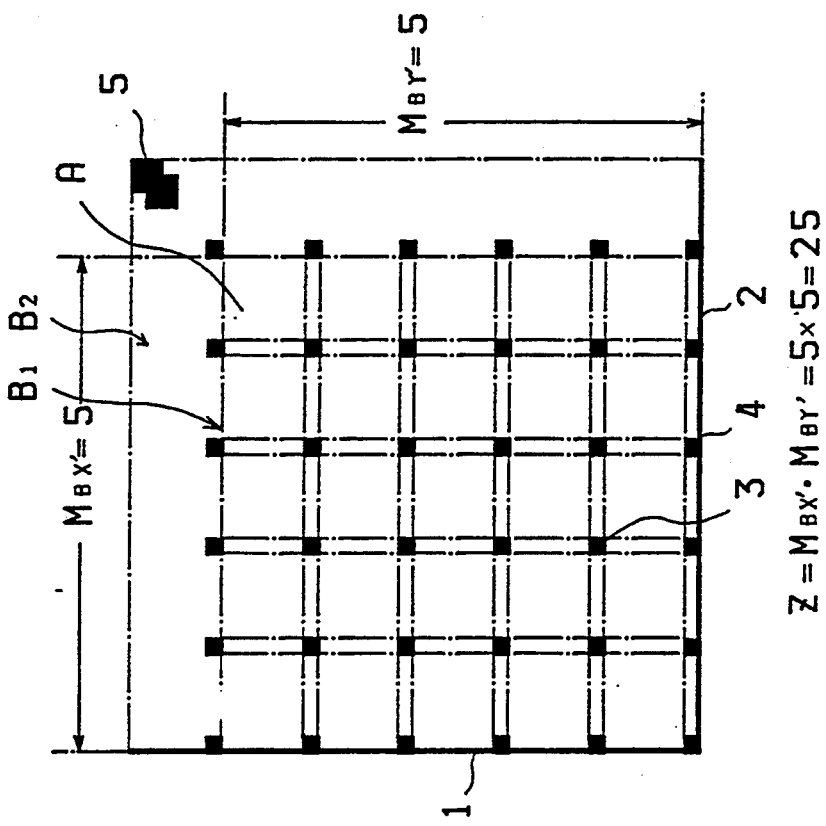
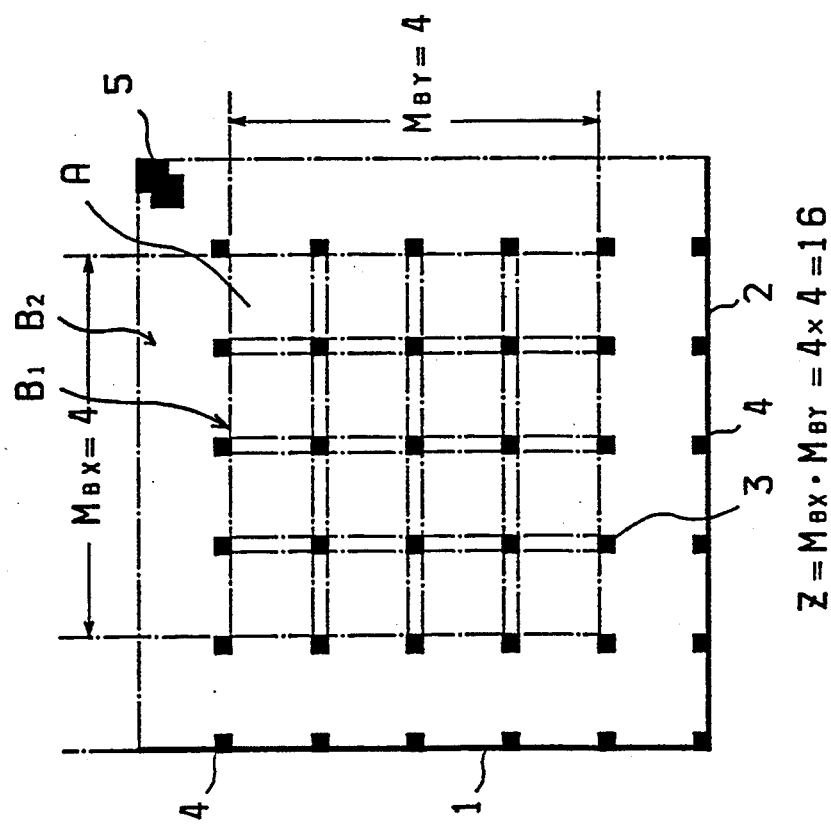

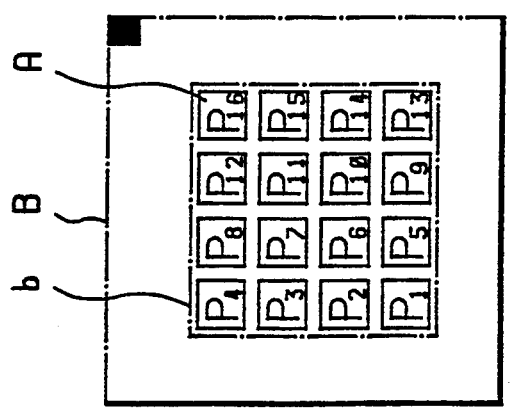
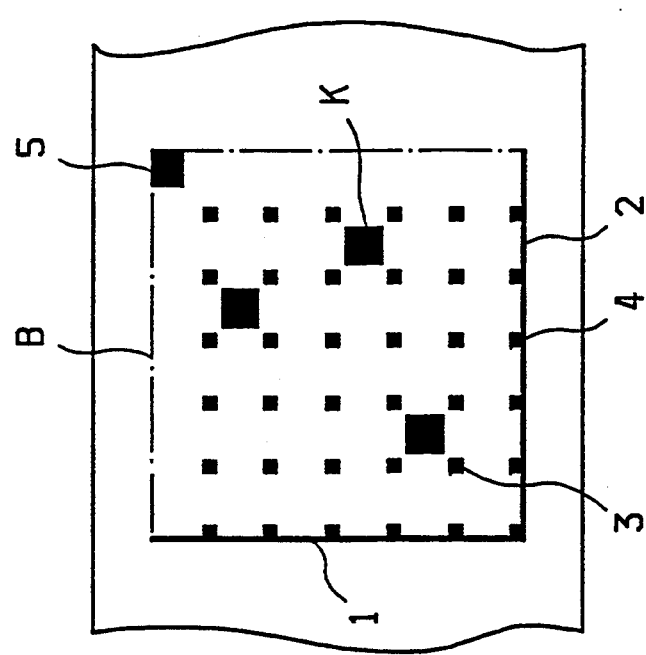

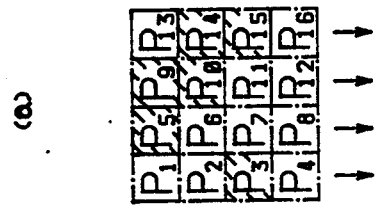
FIG. 19
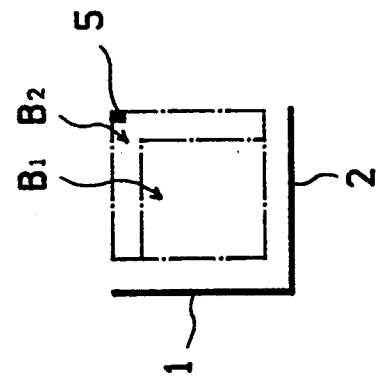
FIG. 20
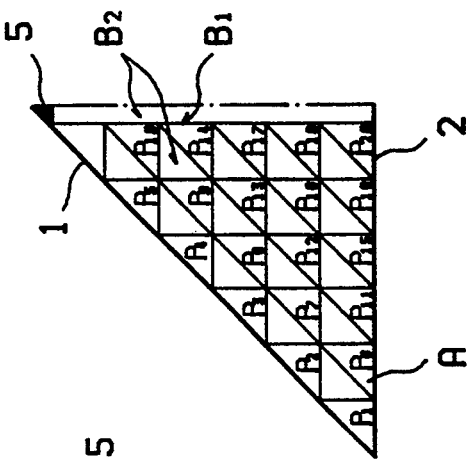
FIG. 21
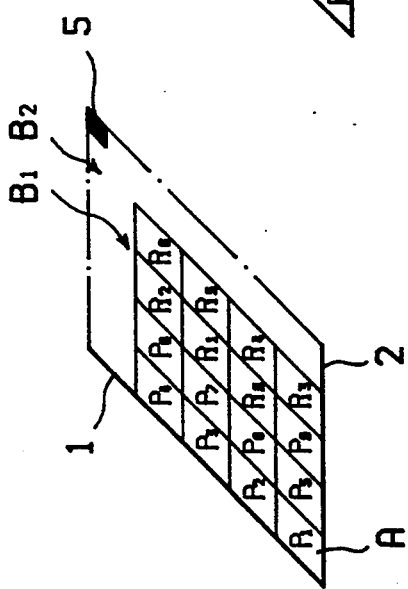
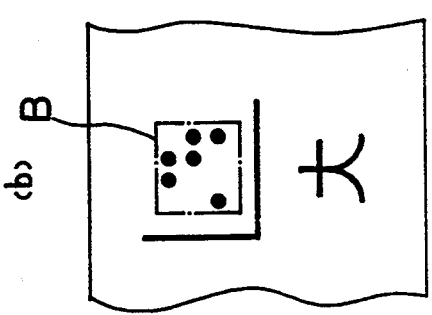

DIGITAL DATA READER OF DIGITAL DATA RECORDING SHEET

This application is a continuation of application Ser. No. 07/651,385 filed on Mar. 7, 1991, now abandoned.

TECHNICAL FIELD

The present invention relates to a digital data reader for digital data communication using a digital data recording sheet. More particularly, it relates to a digital reader for reading the digital data recording sheet with digital data recorded thereon including $2^n$ binary data (e.g. binary data indicating Chinese characters composed of $2^4$ JIS codes) in two directions.

BACKGROUND ART

With respect to a digital data recording sheet and a digital data reader for reading the recording sheet, applicant has invented "Identification Code Sheet" Japanese Patent Application No. Sho 62-173352 (1987) and "Identification Code Reader" Japanese Patent Application Laid Open No. Sho 64-76176 (1989), which have been published in the aforesaid official gazettes.

In the inventions stated above, an identification code sheet for facilitating the display of JIS codes, relative to Chinese characters by displaying binary data of four or more bits in two directions is disclosed, and an identification code reader for accurately reading the digital data is disclosed by delineating a mark area with division marks and recording the binary data in the mark area.

Moreover, applicant has invented "Digital Data Recording Sheet and Method of Digital Data Communication", Japanese Patent Application No. Hei 1-51971 (1989). This application discloses a long distance communication method for communication such as FAX transmissions using the recording sheet, wherein the mark area is delineated by the division marks and binary data is recorded in the mark area.

In the published applications discussed above, errors due to variations in the mark area occur due to expansion and contraction of the recording sheet and changes in paper feeding speed during communication and FAX transmission. Errors in the mark on the digital data recording sheet can be corrected by the prior inventions. However, when the position of the division marks is varied from the original display position due to expansion and contraction of the recording sheet or changes in the recording sheet feeding speed, reading the binary signal mark indicated in the mark area is difficult.

Therefore, it is an object of the first to fourth embodiments of the present application to correct for deformations of the display area without using division marks. It is an object of the fifth embodiment of the present application to ensure detection of the division marks.

SUMMARY OF THE INVENTION

A first embodiment of the present application provides, in combination, an identification code and reading system therefore, comprising:
the identification code including,
a display area defining a data field including,
an X-axis basic line,
a plurality of X-axis internal line position marks,
a Y-axis basic line, intersecting said X-axis basic line,
a plurality of Y-axis internal line position marks,
a plurality of sub-areas in which encoded indicia are located, and
an additional mark, located such that said display area is defined by an area enclosed by said X-axis basic line, Y-axis basic line and said additional mark; and
the identification code reading system including,
display area deciding means for determining a location of said display area on said identification code by determining a location of an X-axis external line and a Y-axis external line disposed on the opposite side of the data field from said X-axis basic line and Y-axis basic lines, respectively,
Y-axis internal line calculating means for determining a location of a plurality of Y-axis internal lines, each passing through one of the plurality of X-axis internal line position marks, said plurality of Y-axis internal lines being equispaced and disposed at angles with respect to the X-axis basic line, the angle of each of said plurality of Y-axis internal lines with respect to said X-axis basic line being:

$$\theta_{Xn} = \theta_o + \frac{\theta_x - \theta_o}{M_{BX}} \times n$$

where:
$\theta_o$ = an angle formed by the intersection of said X-axis basic line and said Y-axis basic line,
$\theta_x$ = an angle formed by the intersection of said X-axis basic line and said Y-axis external line,
$M_{BX}$ = the number of X-axis internal line position marks plus one, and
n = an index used to denote the specific Y-axis internal line being calculated;
X-axis internal line calculating means for determining a location of a plurality of X-axis internal lines, each passing through one of the plurality of Y-axis internal line position marks, said plurality of X-axis internal lines being equispaced, said angle of each of said plurality of X-axis internal lines with respect to said Y-axis basic line is:

$$\theta_{YM} = \theta_o + \frac{\theta_Y - \theta_o}{M_{BY}} \times m$$

where:
$\theta_y$ = an angle formed by the intersection of said Y-axis basic line and said X-axis external line,
$M_{BY}$ = the number of Y-axis internal line position marks plus one, and
m = an index used to denote the specific X-axis internal line being calculated;
mark area basic point detecting means for detecting intersections of the plurality of X-axis internal lines and Y-axis internal lines, each intersection forming a mark area basic point,
reading means for reading the plurality of sub-areas in locations determined by the mark area basic points, and
code converting means for converting the encoded indicia in each of the plurality of sub-areas into character information;
whereby optical and physical distortions of the locations of the x and y axis basic lines, corner mark, and position marks are compensated for at the time of reading data in the data field in order to accurately locate positions of data regions within the data field.

A second embodiment of the present application provides, in combination, a method for reading and processing an identification code, comprising the steps of:

(a) providing the identification code on an object within a data field including, an X-axis basic line, a plurality of X-axis internal line position marks, a Y-axis basic line, intersecting the X-axis basic line, a plurality of Y-axis internal line position marks, a plurality of sub-areas in which encoded indicia are located, and an additional mark, located such that the identification code is defined by an area enclosed by the X-axis basic line, the Y-axis basic line and the additional mark, respectively;

(b) determining a location of the identification code by determining a location of an X-axis external line and a Y-axis external disposed on the opposite side of the identification code from the X-axis basic line and Y-axis basic line position marks, respectively;

(c) determining a location of a plurality of Y-axis internal lines, each passing through one of the plurality of X-axis internal line position marks, said plurality of Y-axis internal lines being equispaced and disposed at angles with respect to the X-axis basic line, the angle of each of the plurality of Y-axis internal lines with respect to the X-axis basic line being:

$$\theta_{Xn} = \theta_o + \frac{\theta_x - \theta_o}{M_{BX}} \times n$$

where:

$\Theta_o$ = an angle formed by the intersection of said X-axis basic line and said Y-axis basic line, $\Theta_x$ = an angle formed by the intersection of said Y-axis basic line and said Y-axis external line, $M_{BX}$ = the number of X-axis internal line position marks plus one, and n = an index to denote the specific the number of Y-axis internal line being calculated;

(d) determining a location of a plurality of Y-axis internal lines, each passing through one of the plurality of Y-axis internal line position marks, said plurality of X-axis internal lines being equispaced and disposed at angles with respect to the Y-axis basic line, the angle of each of said plurality of X-axis internal lines with respect to said Y-axis basic line being:

$$\theta_{YM} = \theta_o + \frac{\theta_Y - \theta_o}{M_{BY}} \times m$$

where:

$\Theta_y$ = an angle formed by the intersection of said Y-axis basic line and said X-axis external line, $M_{BY}$ = the number of Y axis internal line position marks plus one, and m = an index to denote the specific X-axis internal line being calculated;

(e) detecting intersections of the plurality of X-axis internal lines and Y-axis internal lines, each intersection forming a mark area basic point;

(f) reading the plurality of sub-areas in locations determined by the mark area basic points; and (g) converting the encoded indicia in each of the plurality of sub-areas into character information, whereby optical and physical distortions of the locations of the x and y axis basic lines, corner mark, and position marks are compensated for at the time of reading data in the data field in order to accurately locate positions of data regions within the data field.

A third embodiment of the present application is a system for locating and reading digital data in data regions within a data field on a surface and compensating for optical or physical distortions of the data field viewed by an optical reader comprising:

means for defining the data field by providing x-axis and y-axis intersecting basic lines disposed at a predetermined angle with respect to each other and a corner mark on said surface, the corner mark together with the basic lines defining a data field therebetween;

a plurality of position marks for marking predetermined distances between a plurality of imaginary x and y axis internal lines within said data field, said position marks being provided on said surface;

means for defining the positions of a plurality of imaginary x-axis internal lines within said data field, said x-axis internal lines being spaced at predetermined distances from each other defined by the position marks, said x-axis internal lines being disposed at predetermined angles with respect to said y-axis basic line;

means for defining the positions of a plurality of imaginary y-axis internal lines within said data field, said y-axis internal lines being spaced at predetermined distances from each other defined by said position marks said y-axis internal lines being disposed at predetermined angles with respect to said x-axis basic line;

means for calculating the location of the points of intersection of the imaginary x and y axis internal lines at the time of reading said data from the angle between the x and y axis basic lines, the angles of the x-axis internal lines with respect to the y-axis basic line, the angles of the y-axis internal lines with respect to the x-axis basic line and the location of the position marks;

means for locating said data regions within said data field from the calculated locations of the points of intersection of the x and y axis internal lines at the time of reading; and means for reading the digital data within said data regions;

whereby optical and physical distortions of the locations of the x and y axis basic lines, corner mark and position marks are compensated for at the time of reading the data in order to accurately locate positions of the data regions within the data field.

A fourth embodiment of the present application is a method for locating and reading digital data in data regions within a data field on a surface and compensating for optical or physical distortions of the data field viewed by an optical reader, comprising the steps of:

defining the data field by providing x-axis and y-axis intersecting basic lines disposed at a predetermined angle with respect to each other and a corner mark on said surface, the corner mark together with the basic lines defining a data field therebetween;

marking predetermined distances between a plurality of imaginary x and y axis internal lines within said data field with position marks, said position marks being provided on said surface;

defining the positions of a plurality of imaginary x-axis internal lines within said data field, said x-axis internal lines being spaced at predetermined distances from each other defined by the position marks, said x-axis internal lines being disposed at predetermined angles with respect to said y-axis basic line;

defining the positions of a plurality of imaginary y-axis internal lines within said data field, said y-axis internal lines being spaced at predetermined distances from each other defined by said position marks, said y-axis internal lines being disposed at predetermined angles with respect to said x-axis basic line;

calculating the location of the points of intersection of the imaginary x and y axis internal lines at the time of reading said data from the angle between the x and y axis basic lines, the angles of the x-axis internal lines with respect to the y-axis basic line, the angles of the y-axis internal lines with respect to the x-axis basic line and the location of the position marks;

locating said data regions within said data field from the calculated locations of the points of intersection of the x and y axis internal lines at the time of reading; and reading the digital data within said data regions;

whereby optical and physical distortions of the locations of the x and y axis basic lines, corner mark and position marks are compensated for at the time of reading the data in order to accurately locate positions of the data regions within the data field.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 1 is a block diagram of the first to fourth embodiments showing a microcomputer for performing various functions.

FIG. 2 is an explanatory view showing a method of calculating data areas for reading the digital data recording sheet in the first embodiment.

FIG. 3 is a similar explanatory view of the second embodiment of the present application.

FIG. 4 is an explanatory view showing a method of delineating more dense data areas for reading the digital data recording sheet in the second embodiment.

FIG. 10 to FIG. 14 are plan views of the digital data recording sheet used in the present application.

FIG. 15 and 16 are explanatory view of a display area.

FIGS. 19a and 19b are explanatory views showing examples of display in a display areas.

FIG. 20 is an explanatory view of a display area having an auxiliary area.

FIG. 21 is an explanatory view showing display areas when an X-axis basic line and a Y-axis basic line are not orthogonally intersected.

DETAILED DESCRIPTION OF THE PREFERRED EMBODIMENTS

The present invention will be described more particularly with reference to the accompanying drawings.

Figure 17:
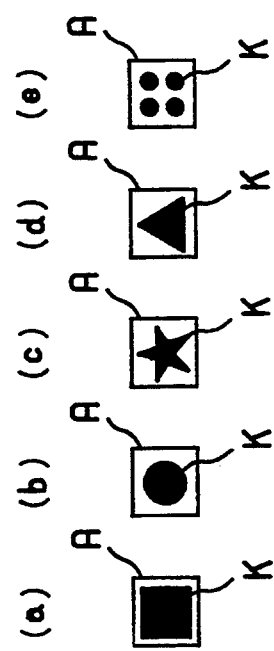
FIG. 17 is an explanatory view of binary code marks.

In the present application, the digital code recording sheet (identification code sheet) disclosed in Japanese Patent Application Laid Open No. Sho 64-86289 (1989) (Identification Code Sheet) and Japanese Patent Application Laid Open No. Sho 64-76176 (1989) (Identification Code Reader) by applicant are used. The digital code recording sheet, illustrated in FIGS. 15 and 16 includes a code display surface B having a quadrangular display area b of suitable shape and area defined by an X-axis basic line 2, a Y-axis basic line 1 and an additional mark 5, which form display area 6. Display area 6 is divided into mark areas (small divisions) A of more than $2^4 = 16$ (in FIG. 16, the display area is divided into 16 mark areas of $P_1$, $P_2$, $P_3$, ... $P_{16}$). By recording a binary signal mark K (in FIG. 15) in one of the mark areas A, 16 binary codes are recorded in the whole display area b and $2^4 \times 4$ characters (i.e. by combining four out of 0, 1, 2, ... F at $2^4$) maybe represented. Therefore any Chinese character can be recorded and displayed by one display area b. The binary signal mark K for recording and displaying digital data (binary code) in respective mark areas A, is not necessarily completely filled in as shown in FIG. 17(a), but a blank portion may be in the mark area A as illustrated in FIGS. 17 (b), (c), (d). Various marks may be used, for example, a circle in FIG. 17(b), a star in FIG. 17(c) and a triangle in FIG. 17(d), and furthermore, as shown in FIG. 17(e), the binary signal K may be formed by arranging a plurality of smaller marks k of any shape. Also, the binary signal in the mark area A may be made by punching or magnetic ink.

Figure 18:
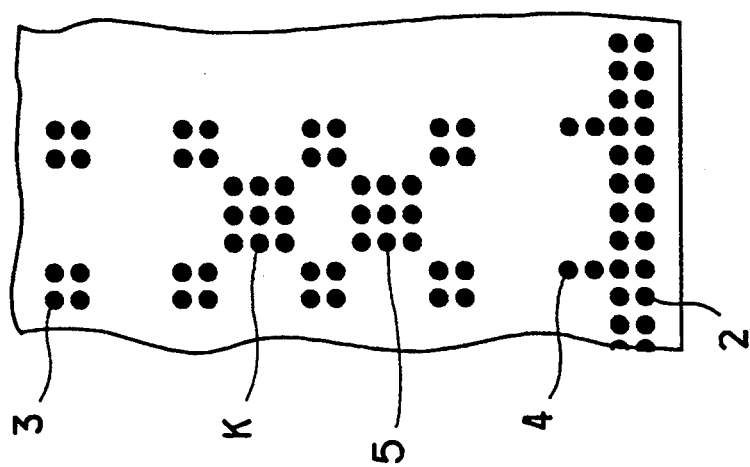
FIG. 18 is a fragmentary explanatory view of the discrimination code sheet of FIG. 17 showing the recorded state of binary code marks.

FIG. 18 illustrates the digital data recording sheet of FIG. 15 printed by a 24-dot personal computer printer, wherein two dots are allocated to an internal line position mark 4, four dots to a division mark 3, and nine dots to the binary signal mark K displayed in the mark area A surrounded by the division mark 3. Nine dots are also allocated to the additional mark 5.

FIG. 19 illustrates the recorded digital data (binary code data) with respect to the digital data recording sheet, wherein FIG. 19(a), a display area B is divided into $2^4 = 16$ mark areas A, which are respectively addressed by $P_1$, $P_2$, ... $P_{16}$ and each mark area A is divided into intermediate divisions of $Q_1$, $Q_2$, $Q_3$, $Q_4$.

FIG. 19(b) illustrates JIS Chinese character " " where character code 4267 is recorded.

FIG. 20 illustrates an auxiliary area $B_2$ which is provided on the outside of a data area $B_1$ (16 mark areas A and 25 mark areas A in FIG. 13 and FIG. 14) of $P_1$ ... $P_{16}$ of FIG. 19(a), and additional information (reading direction, country name, number of pages, parity check code etc.) for transmitting the data are displayed in the auxiliary area. Referring to FIG. 13, the number, Z, of mark areas A of the data area $B_1$ is calculated by the following equation, $Z = M_{BX} \times M_{BY}$ where, $M_{BX}$ = the number of mark areas A in a direction of an X-axis (the number of internal line position marks on X-axis of the data area $B_1 - 1$)

$M_{BY}$ = the number of mark areas A in a direction of an Y-axis (the number of internal line position marks on Y-axis of the data area $B_1 - 1$).

From the number Z, the number of bits of data area $B_1$ is calculated as follows:

The number of data bits $= 2^z$, $Z = M_{BX} \times M_{BY}$

Example 1) character, code: $M_{BX} = 4$, $M_{BY} = 4$ the number of bits $2^{16} = 65,536$ (24 dot print)

Example 2) music etc.: $M_{BX} = 5$, $M_{BY} = 4$ the number of bits $2^{20} =$ 1,048,576

(32 dot print)

Example 3) color image: $M_{BX} = 6$, $M_{BY} = 4$ the number of bits $2^{24} =$ 16,777,210

32 dot print)

FIG. 14 illustrates a case wherein the mark area A is determined by utilizing auxiliary division mark (also referred to as internal line position marks) 4, X-axis basic line 2, and Y-axis basic line 1, and the division mark 3. The number $M_{BX}$ of mark areas A in the X-axis direction and the number $M_{BY}$ of mark areas A in the Y-axis direction are as follows.

$M_{BX}$ = the number of internal line position marks 4 in the X-axis direction of the data area $B_l$.

$M_{BY}$ = the number of internal line position marks 4 in the Y-axis direction of the data area $B_1$.

Although the division mark 3 is necessary for carrying out the third embodiment, it may be omitted, as shown in FIG. 11 and FIG. 12, in the first four embodiments, and moreover, as shown in FIG. 10, the internal line position marks 4 can also be omitted.

Figure 9:
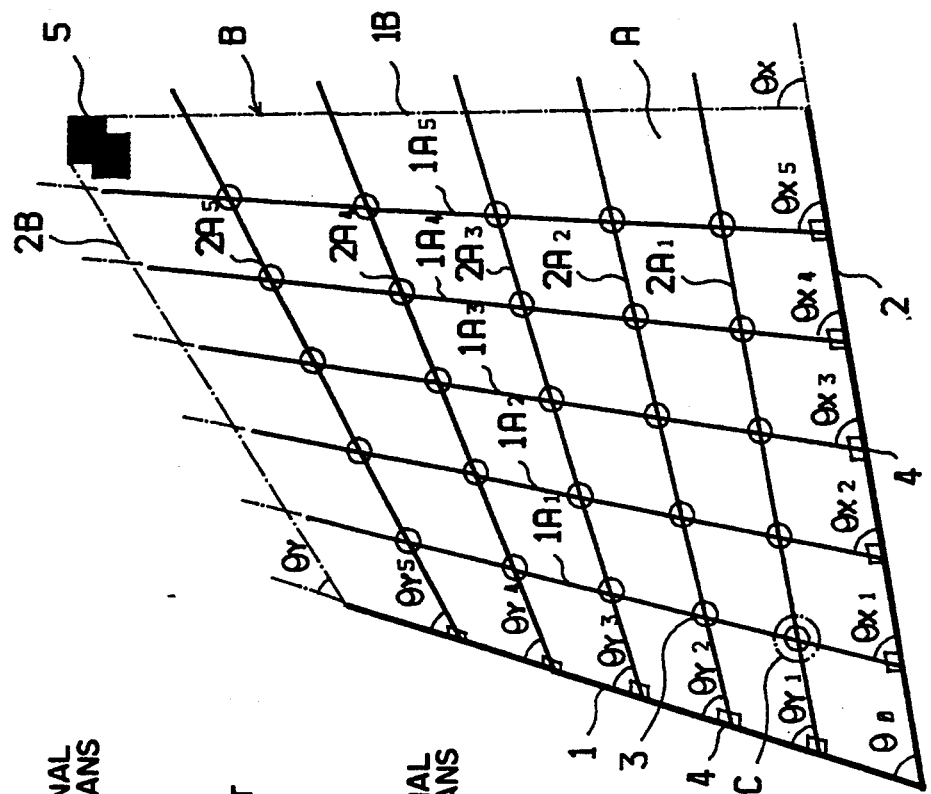
FIG. 9 is an explanatory view showing a method of calculating data areas for reading the digital data recording sheet in the fifth embodiment.

In the case wherein the division mark 3 and the internal line position mark 4 are not necessary for reading data, they can be added for the purpose of printing data on the digital data recording sheet and confirming the write position. In this case, the division mark 3 and internal line position mark 4 may be printed in different colors or types of ink from the ink utilized for the X-axis basic line 2, Y-axis basic line 1, additional marks 5, as well as, the binary signal mark K to make data reading easier. Similarly, the X-axis internal lines 2A and Y-axis internal lines 1A displaying the mark area A, as shown in FIG. 9 may preferably be printed with unreadable ink such that the mark area A can be visually confirmed. Furthermore, the X-axis internal lines 2A, Y-axis internal lines 1A, X-axis basic line 2, Y-axis basic line 1, additional mark 5, and internal line position mark 4 may be printed with unreadable ink in order to facilitate visual confirmation of the mark area A during data writing and printing.

Next, a digital data reader of the present invention will be described. Referring to FIG. 1 and FIG. 2, a first embodiment will be described.

A microcomputer 10 which moves a sensor (line sensor) 8, inputs read signals, and outputs JIS Chinese character codes, other displays and binary signals for printout to output device 9 such as a display or printer.

Microcomputer 10 includes display area deciding means 11, Y-axis internal line calculating means 12, X-axis internal line calculating means 13, mark area basic point detecting means 14, mark area calculating means 15, data discriminating means 16, binary code conversion means 17, and code conversion means 18.

The display area deciding means 11 detects the X-axis basic line 2, Y-axis basic line 1 and additional mark 5, and determines the location of the display area B. (e.g. refer to prior Japanese Patent Application Laid Open No. Sho 64-76176 (1989).

The Y-axis internal line calculating means 12 functions to calculate Y-axis internal lines 1A, by calculating the difference between the intersection angle $\Theta_o$ of the X-axis basic line 2 and the Y-axis basic line 1 and the intersecting angle $\Theta_x$ of the X-axis basic line 2 and the Y-axis external line 1B of the display area, by calculating the intersecting angle $\Theta_{xn}$ with the X-axis basic line 2 as, $$\theta_{xn} = \theta_o + \frac{\theta_x - \theta_o}{M_{BX}} \times n$$

where $M_{BX}$ = the number of mark areas in a direction of the X-axis, and determining starting points of the Y-axis internal lines 1A on the X-axis basic line 2, and n = an index used to denote the specific Y-axis internal line being calculated.

The X-axis internal line calculating means 13 functions to calculate the X-axis internal line 2A, by detecting the intersecting angle $\Theta_o$ of the X-axis basic line 2 and Y-axis basic line 1 and the intersecting angle $\Theta_Y$ of the Y-axis basic line 1 and the Y-axis external line 2B of the display area, calculating the intersecting angle $\Theta_{YN}$ with the Y-axis basic line 1 as, $$\theta_{Yn} = \theta_o + \frac{\theta_Y - \theta_o}{M_{BY}} \times n$$

where $M_{BY}$ = the number of mark areas in a direction of the Y-axis, and n = an index to denote the specific X-axis internal line being calculated, and determining starting points of the X-axis internal lines 2A on the Y-axis basic line.

The starting points of the Y-axis internal lines 1A on the X-axis basic line 2 and the starting points of the X-axis internal lines 2A on the Y-axis basic line 1, according to the first embodiment of FIG. 2, and the second embodiment of FIG. 3, are calculated by the Y-axis internal line calculating means 12 and the X-axis internal line calculating means 13, as the Y-axis internal line 1A passing through the internal line position marks 4 on the X-axis basic line 2, and as the X-axis internal line 2A passing through the internal line position marks 4 on the Y-axis basic line 1.

The mark area basic point detecting means 14 functions to calculate a mark area basic point D by calculating, with respect to the Y-axis internal lines 1A and the X-axis internal lines 2A, a point of intersection of the internal lines 1A and 2A.

The mark area calculating means 15 functions to calculate the respective mark areas A in response to the mark area basic points D calculated by the mark area basic point detecting means 14.

The data discriminating means 16 performs image processing with respect to the respective mark areas A, and includes the capability of detecting the presence of a binary signal mark K, when a value of the binary signal mark K input in proportion to the area of each mark area A, is within a predetermined a size area (e.g. in the embodiment of FIG. 18, an integrated value corresponds to 4 to 9 dots), and the binary code conversion means 17 includes a function to determine the binary code value by detecting the presence of the binary signal mark K in each mark area. Microcomputer 10, includes an operation unit (CPU) 20 for performing the functions described above, memory means 21, input interface means 22, and output interface means 23.

A method of reading data according to the first embodiment will now be described.

The digital data recording sheet such as the illustrated in FIG. 10 is input by long distance communication such as FAX or mail, or is used as a product code on various products, during reading, as shown in FIG. 2. However, errors in the digital data recording sheet are introduced due to expansion and contraction of the recording sheet may occur in an incident direction of a laser beam of a read sensor and in recording sheet feeding direction. Further, errors are also introduced in the digital data recording sheet due to changes in the diagonal angle of the X-axis basic line 2 and the Y-axis external line 1B connecting the additional mark 5 and the X-axis basic line 2 and the Y-axis basic line 1 may become unparallel, resulting in a display area B shaped like an irregular quadrangle, as illustrated in FIG. 2.

The present invention is provided, in order to prevent the aforementioned errors, and designed to read the binary signal mark K accurately by calculating the original display area B and then correcting for errors due to deformation of the display area B. In the following, an example using the a method of the present application will be described.

As shown in FIG. 10 to FIG. 14, on the original display area B of the digital recording sheet, the X-axis basic line 2, Y-axis basic line 1 and additional mark 5 are printed, to form a rectangular parallelogram. Accordingly, when the digital recording sheet is expanded due to a stress exerted on the digital recording sheet, the sheet feeding speed, or for any other reason, the digital recording sheet deforms so that the previously described equations for calculating $\Theta_{xn}$ and $\Theta_{Yn}$ are necessary.

The display area detecting means 11 of microcomputer 10 detects the deformed display area B surrounded by the X-axis basic line 2, Y-axis basic line 1, and additional mark 5, and calculates the Y-axis external line 1B and the X-axis external line 2B.

The Y-axis internal line calculating means 12 calculates the difference between the intersecting angle $\Theta_o$ of the X-axis basic line 2 and the Y-axis basic line 1, and the intersecting angle $\Theta_x$ of the Y-axis external line 1B and X-axis basic line 2, and calculates a starting point on the X-axis basic line 2 (in the embodiment of FIG. 3, the starting point is calculated by the internal line position mark 4 adjoining the X-axis basic line 2) for each of the Y-axis internal lines $1A_1, 1A_2, 1A_3, \ldots 1A_n$. The intersecting angle $\Theta_{Xn}$ for each of the Y-axis internal lines $1A_1, 1A_2,$ and $1A_3 \ldots 1A_n$ and the X-axis basic line 2, is determined as follows:

$$\theta_{xn} = \theta_o + \frac{\theta_x - \theta_o}{M_{BX}} \times n$$

where, $M_{BX}$ = the number of mark areas in the X-axis direction and n denotes the specific Y-axis internal line being calculated.

The X-axis internal line calculating means 13 calculates the difference between the intersecting angle $\Theta_o$ of the X-axis basic line 2 and Y-axis basic line 1, and the intersecting angle $\Theta_Y$ of the X-axis external line 1B and Y-axis basic line 1, and calculates a starting point on the Y-axis basic line 1 (in the embodiment of FIG. 3, the starting point is calculated by the internal line position mark 4 adjoining the Y-axis basic line 1) for each of the X-axis internal lines $2A_1, 2A_2, 2A_3 \ldots 2A_n$. The intersecting angle $\Theta_{Yn}$ for each of the X-axis internal lines $2A_1, 2A_2, 2A_3, \ldots 2A_n$, and the Y-axis basic line 1 is determined as follows:

$$\theta_{Ym} = \theta_o + \frac{\theta_Y - \theta_o}{M_{BY}} \times m$$

where, $M_{BY}$ = the number of mark areas in the Y-axis direction m denotes the specific X-axis internal line being calculated.

In the embodiment stated above, for the Y-axis internal line 1An and X-axis internal line 2Am, although the difference of the intersecting angles is corrected equally, various corrections may be applied, for example, by increasing the correcting amount progressively from the X-axis basic line 2 to X-axis external line 2B, or from the Y-axis basic line 1 to Y-axis external line 1B, or correcting three dimensionally from a point spaced from the display area.

Next, the mark area basic point detecting means 14 calculates points of intersection (mark area basic points) D of the aforesaid Y-axis internal lines $1A_1, 1A_2, 1A_3 \ldots 1An$ and the X-axis internal lines $2A_1, 2A_2, 2A_3 \ldots 2Am$.

The mark area calculating means 15 calculates the mark area A in response to the mark area basic points D detected by the mark area basic point detecting means 14.

The data discriminating means 16 outputs binary signals or binary data of ON/OFF or Low/High, by determining whether the binary signal mark K is present in the mark area A and designating the mark area A as ON, or determining whether binary signal mark K is not present in the mark area A and designating the mark area A as OFF.

In the second embodiment, the Y-axis internal line calculating means 12 functions, to calculate, for each Y-axis internal line 1A' one or more Y-axis internal lines 1A", whose starting point on the X-axis basic line 2 is determined by the Y-axis internal line 1A'. The starting point on the X-axis basic line 2 of the Y-axis internal lines 1A' is defined as the position of the respective internal line position mark 4. Further, the X-axis internal line calculating means 13 calculates for each X-axis internal line 2A', one or more X-axis internal lines 2A" whose starting point on the Y-axis basic line 1 determined by the x-axis internal lines 2A'. The starting point on the y-axis basic line of the x-axis internal lines 2A' is defined as the position of the respective internal line position mark 4.

Accordingly, as shown in FIG. 4, one or more Y-axis internal lines 1A″ are calculated between the Y-axis internal lines 1A′ whose starting points are the internal line position mark 4, and one or more X-axis internal lines 2A″ are calculated between the X-axis internal lines 2A′ whose starting points are the internal line position marks 4. As a result, the number of mark area basic points D, as well as, the number of mark areas A is increased.

The mark area calculating means 15 functions to calculate a predetermined area about the mark area basic point D in order to define the mark area A.

Figure 7:
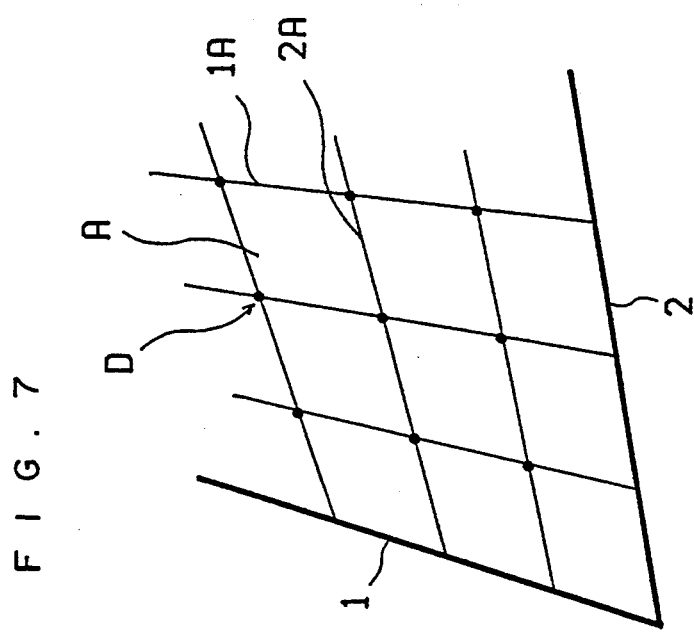
FIG. 7 is an explanatory view showing a method of calculating data areas for reading the digital data recording sheet in the fourth embodiment.
Figure 5:
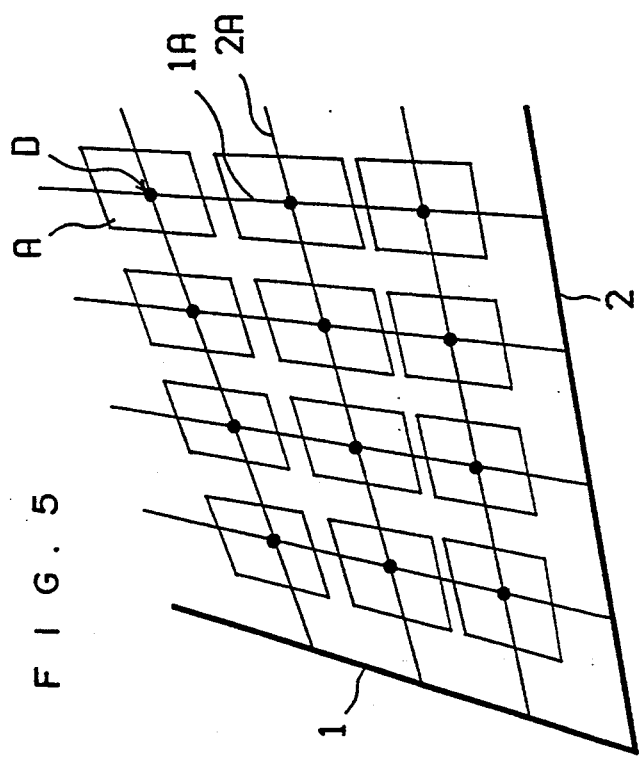
FIG. 5 is an explanatory view showing a method of calculating data areas for reading the digital data recording sheet in the third embodiment.
Figure 6:
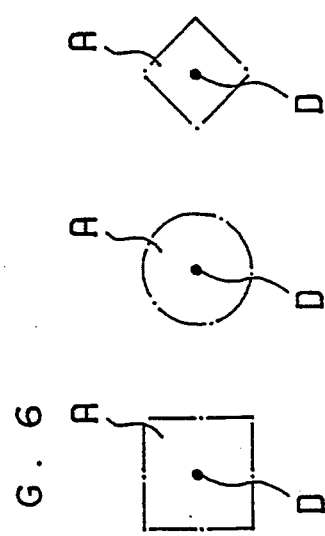
FIG. 6 is a schematic view of data areas.

Mark areas A may be bounded by four intersecting points of X-axis internal lines and Y-axis internal lines as illustrated in FIG. 7 or an intersection may be the centroid of the mark area, as illustrated in FIG. 5. As shown in FIG. 5, in place of the division mark 4 of the prior embodiment, the mark area A may be determined by the mark area basic point D alone and formed into various shapes as shown in FIG. 6.

In a modification of the previous embodiment, illustrated in FIG. 7 the mark area calculating means 15 functions to calculate an area surrounded by four mark area basic points D as for example, the mark area A (the area surrounded by two starting points of the Y-axis internal lines 1A on the X-axis basic line 2 and two mark area basic points D near the starting points, and the area surrounded by two starting points of the X-axis internal line 2A on the Y-axis basic line 1 and two mark area basic points D facing the starting points are also calculated as the mark area A) as shown in FIG. 7. That is, the mark area basic points D regulates the periphery of the mark area A in the same manner as the division marks 4 of the previous embodiments.

Figure 8:
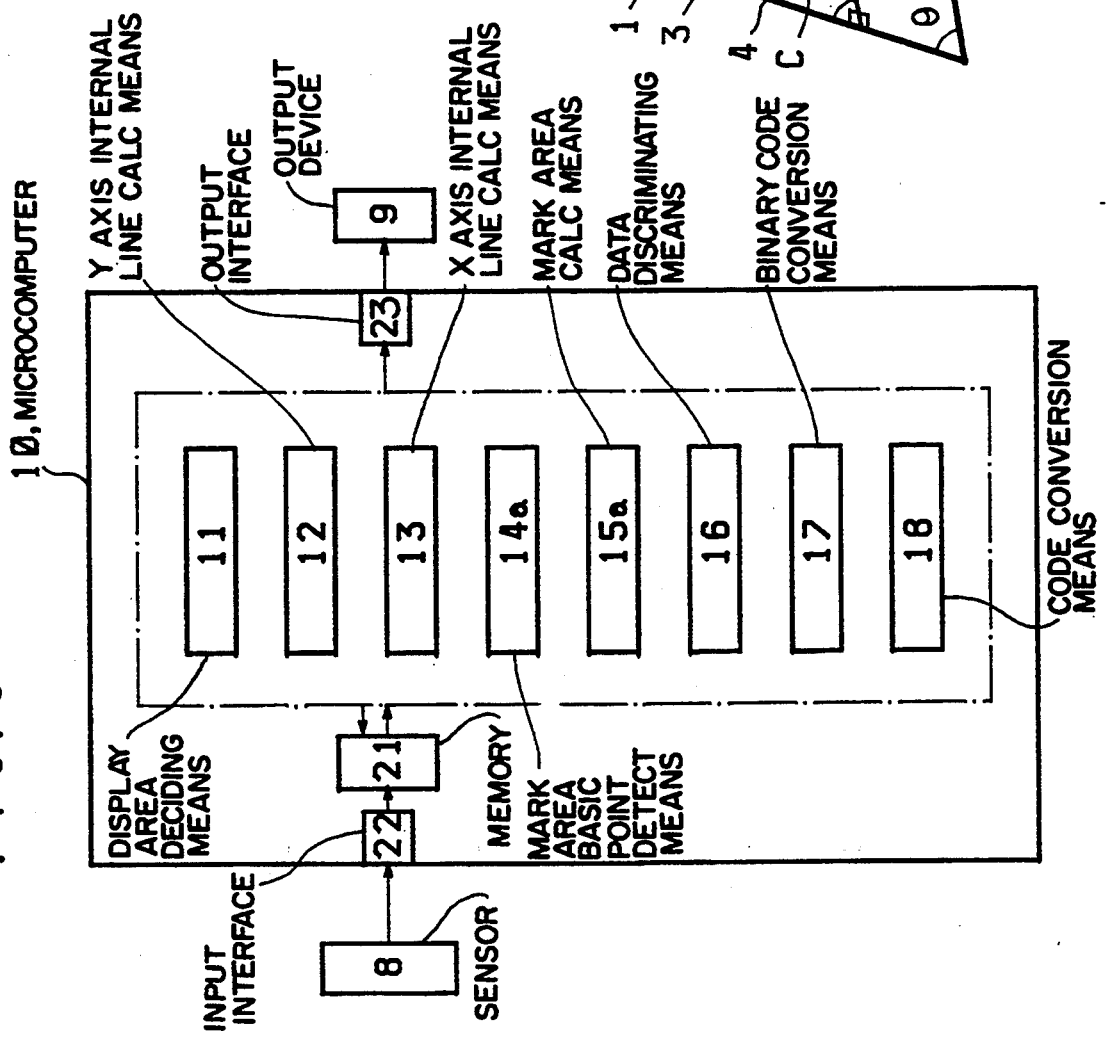
FIG. 8 is a block diagram of the fifth embodiment showing a microcomputer for performing various functions.

Referring to FIG. 8, in the third embodiment, in place of the mark area basic point detecting means 14 of the previous embodiment, division mark detecting means 14a is utilized wherein division marks 3 at the point of intersection of the internal lines is detected, and the mark area calculating means 15a functions to calculate the mark area A in response to the division marks 3 detected by the division mark detecting means 14a.

When reading data according to the third embodiment, referring to FIG. 9, the division mark detecting means 14a detects the intersecting points of the Y-axis internal lines $1A_1$, $1A_2$, $1A_3$ ... $1An$ and the X-axis internal lines $2A_1$, $2A_2$, $2A_3$ ... $2An$, and detects the division marks 3 positioned in a constant tolerance C relative to the intersecting points. The mark area calculating means 15a detects the areas surrounded by the division mark 3 detected by the division mark detecting means 14a and defined those areas (or including the area surrounded by the auxiliary division mark 5, X-axis basic line 2 and Y-axis basic line 1) as the mark areas A.

The present invention may be carried out more effectively by determining the position of the division marks 3 by allowing some degree of tolerance by allowing a certain discrepancy in position, when positioning the division marks 3 in the present invention.

As a result, even when the display area B is deformed, the mark areas A are specified accurately and the binary signal marks K can be read and output.

In conventional methods, compensation for movement of the division mark 3 due to deformation of the display area, when the division mark 3 and the binary signal mark K of the mark area A are the same type of signal (e.g. printed by ink having the same color), cannot be performed. In order to prevent erroneous reading of the binary signal mark K in the mark area A the conventional method uses different types of ink, such as fluorescent ink and magnetic ink) for the binary signal mark K and the division mark 3 or change the shape of the binary signal mark K and the division mark 3 Both of these have drawbacks, when compared with the present invention, such as increase in cost, longer image processing time, and a higher chance of error.

In the present invention, although the X-axis basic line 2 and the Y-axis basic line 1 cross orthogonally, as shown in FIG. 15, they may be crossed at a suitable angle and the mark area A may be formed into a shape other than a quadrangle, as shown in FIG. 4.

Since the first embodiment, as discussed above aforementioned, corrects for the deformation of the display area by correcting position of the mark areas by detecting the intersections of the Y-axis internal line and the X-axis internal lines, data of the recording sheet can be read accurately even when expansion and contraction of the digital data recording sheet occurs or the reading direction of a sensor (e.g. errors in the irradiating direction of a sensor laser beam) is changed.

In the second embodiment, data volume of the digital data recording sheet can be increased by increasing the number Y-axis internal lines and X-axis internal lines to produce a greater number of mark areas A.

In a modification of the first embodiment, the mark areas A can be optionally set by the operation of the microcomputer in response to the mark area basic point detected in the first embodiment.

In a modification of the first embodiment, the mark area basic points are utilized to define the periphery of the mark areas similar to the division marks 3 utilized in the first embodiment.

In the third embodiment, since the mark areas are determined by correcting the position of the division marks due to deformation of the display area as stated above, data on recording sheet can be read accurately in spite of the deformation of the display area.

Thus, errors in reading data on the recording sheet, due to expansion and contraction of the digital data recording sheet and changes in the reading direction of a sensor (e.g. errors in the irradiating direction of a sensor laser beam) can be prevented.

Further, although the code display surface illustrated in the preferred embodiment of the present application is quadrangular, the same principles discussed above with respect to the angle and origin of internal lines could be applied to other geometrically shaped code display surfaces such as the parallelogram and right triangle illustrated in FIG. 21.

INDUSTRIAL APPLICABILITY

As mentioned above, a digital data reader and digital data recording sheet according to the present invention solves the problems errors introduced due to deformation of the mark areas, by expansion and contraction of the sheet or changes in the sheet feeding speed, and accurately reads information on the digital data recording sheet.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. In combination an identification code and reading system therefore, comprising:

the identification code including,
a display area defining a data field including,
an X-axis basic line,
a plurality of X-axis internal line position marks,
a Y-axis basic line, intersecting said X-axis basic line,
a plurality of Y-axis internal line position marks,
a plurality of sub-areas in which encoded indicia are located, and
an additional mark, located such that said display area is defined by an area enclosed by said X-axis basic line, Y-axis basic line and said additional mark; and the identification code reading system including
display area deciding means for determining a location of said display area on said identification code by determining a location of an X-axis external line and a Y-axis external line disposed on the opposite side of the data field from said X-axis basic line and Y-axis basic lines, respectively, Y-axis internal line calculating means for determining a location of a plurality of Y-axis internal lines, each passing through one of the plurality of X-axis internal line position marks, said plurality of Y-axis internal lines being equispaced and disposed at angles with respect to the X-axis basic line, the angle of each of said plurality of Y-axis internal lines with respect to said X-axis basic line being:

$$\theta_{Xn} = \theta_o + \frac{\theta_x - \theta_o}{M_{BX}} \times n$$

where:
$\Theta_o$ = an angle formed by the intersection of said X-axis basic line and said Y-axis basic line,
$\Theta_x$ = an angle formed by the intersection of said X-axis basic line and said Y-axis external line,
$M_{BX}$ = the number of X-axis internal line position marks plus one, and
n = an index used to denote the specific Y-axis internal line being calculated;

X-axis internal line calculating means for determining a location of a plurality of X-axis internal lines, each passing through one of the plurality of Y-axis internal line position marks and disposed at angles with respect to the Y-axis basic line, the plurality of X-axis internal lines being equispaced, said angle of each of said plurality of X-axis internal lines with respect to said Y-axis basic line being:

$$\theta_{YM} = \theta_o + \frac{\theta_Y - \theta_o}{M_{BY}} \times m$$

where:
$\Theta_Y$ = an angle formed by the intersection of said Y-axis basic line and said X-axis external line,
$M_{BY}$ = the number of Y-axis internal line position marks plus one, and
m = an index used to denote the specific X-axis internal line being calculated;

mark area basic point detecting means for detecting intersections of the plurality of X-axis internal lines and Y-axis internal lines, each intersection forming a mark area basic point, reading means for reading the plurality of sub-areas in locations determined by the mark area basic points, and code converting means for converting the encoded indicia in each of the plurality of sub-areas into character information;

whereby optical and physical distortions of the locations of the x and y axis basic lines, corner mark, and position marks are compensated for at the time of reading data in the data field in order to accurately locate positions of the sub-areas within the data field.

2. The combination of claim 1, wherein each mark area basic point is centered on one of the plurality of sub-areas.

3. The combination of claim 1, wherein more than two mark area basic points determine a boundary of each of the plurality of sub-areas.

4. The combination of claim 1,
said identification code reading system further including,
X-axis internal sub-line calculating means for determining a location of a plurality of X-axis internal sub-lines, between each of the plurality of X-axis internal lines, and
Y-axis internal sub-line calculating means for determining a location of a plurality of Y-axis internal sub-lines, between each of the plurality of Y-axis internal lines,
said mark area basic point detecting means further detecting intersections of the plurality of X-axis internal sub-lines and Y-axis internal sub-lines, thereby increasing data density of said identification code.

5. The combination of claim 1, wherein said identification code is in the shape of a parallelogram.

6. The combination of claim 5, wherein said identification code is in the shape of a square.

7. The combination of claim 1, said identification code further including an auxiliary area for locating auxiliary encoded indicia representing auxiliary information,
said additional mark being located such that said display area includes said auxiliary area.

8. A method for reading and processing an identification code, comprising the steps of:
(a) providing the identification code on an object within a data field including,
an X-axis basic line,
a plurality of X-axis internal line position marks,
a Y-axis basic line, intersecting the X-axis basic line,
a plurality of Y-axis internal line position marks,
a plurality of sub-areas in which encoded indicia are located, and
an additional mark, located such that the identification code is defined by an area enclosed by the X-axis basic line, the Y-axis basic line and the additional mark, respectively;
(b) determining a location of the identification code by determining a location of an X-axis external line and a Y-axis external line disposed on the opposite side of the identification code from the X-axis basic line and the Y-axis basic line position marks, respectively;
(c) determining a location of a plurality of Y-axis internal lines, each passing through one of the plurality of X-axis internal line position marks, said plurality of Y-axis internal lines being equispaced and disposed at angles with respect to the X-axis basic line, the angle of each of the plurality of Y-axis internal lines with respect to the X-axis basic line being:

$$\theta_{Xn} = \theta_o + \frac{\theta_x - \theta_o}{M_{BX}} \times n$$

where:
- $\Theta_o$ = an angle formed by the intersection of said X-axis basic line and said Y-axis basic line,
- $\Theta_x$ = an angle formed by the intersection of said X-axis basic line and said Y-axis external line,
- $M_{BX}$ = the number of X-axis internal line position marks plus one, and
- n = an index to denote the specific Y-axis internal line being calculated;

(d) determining a location of a plurality of X-axis internal lines, each passing through one of the plurality of Y-axis internal line position marks, said plurality of X-axis internal lines being equispaced and disposed at angles with respect to the Y-axis basic line, the angle of each of said plurality of X-axis internal lines with respect to said Y-axis basic line being:

$$\theta_{YM} = \theta_o + \frac{\theta_Y - \theta_o}{M_{BY}} \times m$$

where:
- $\Theta_y$ = an angle formed by the intersection of said Y-axis basic line and said X-axis external line,
- $M_{BY}$ = the number of Y-axis internal line position marks plus one, and
- m = an index to denote the specific X-axis internal line being calculated;

(e) detecting intersections of the plurality of X-axis internal lines and Y-axis internal lines, each intersection forming a mark area basic point;

(f) reading the plurality of sub-areas in locations determined by the mark area basic points; and (g) converting the encoded indicia in each of the plurality of sub-areas into character information, whereby optical and physical distortions of the locations of the X and Y axis basic lines, corner mark, and position marks are compensated for at the time of reading data in the data field in order to accurately locate positions of the sub-areas within the data field.

9. The method of claim 8, wherein each mark area basic point is centered on one of the plurality of sub-areas.

10. The method of claim 8, wherein more than two mark area basic points determine a boundary of each of the plurality of sub-areas.

11. The method of claim 8, said step (c) further including the sub-step of, (c)(1) determining a location of a plurality of Y-axis internal sub-lines, between each of the plurality of Y-axis internal lines; said step (d) further including the sub-step of, (d)(1) determining a location of a plurality of X-axis internal sub-lines, between each of the plurality of X-axis internal lines; and said step (e) further including the sub-step of, (e)(1) detecting intersections of the plurality of X-axis sub-lines and Y-axis internal sub-lines, thereby increasing data density of the identification code.

12. The method of claim 8, wherein the identification code is in the shape of a parallelogram.

13. The method of claim 12, wherein the identification code is in the shape of a square.

14. The method of claim 8, the identification code further including an auxiliary area for locating auxiliary encoded indicia representing auxiliary information.

15. A system for locating and reading digital data in data regions within a data field on a surface and compensating for optical or physical distortions of the data field viewed by an optical reader comprising:

means for defining the data field by providing x-axis and y-axis intersecting basic lines disposed at a predetermined angle with respect to each other and a corner mark on said surface, the corner mark together with the basic lines defining a data field therebetween;

a plurality of position marks for marking predetermined distances between a plurality of imaginary x and y axis internal lines within said data field, said position marks being provided on said surface;

means for defining the positions of a plurality of imaginary x-axis internal lines within said data field, said x-axis internal lines being spaced at predetermined distances from each other defined by the position marks, said x-axis internal lines being disposed at predetermined angles with respect to said y-axis basic line;

means for defining the positions of a plurality of imaginary y-axis internal lines within said data field, said y-axis internal lines being spaced at predetermined distances from each other defined by said position marks, said y-axis internal lines being disposed at predetermined angles with respect to said x-axis basic line;

means for calculating the location of the points of intersection of the imaginary x and y axis internal lines at the time of reading said data from the angle between the x and y axis basic lines, the angles of the x-axis internal lines with respect to the y-axis basic line, the angles of the y-axis internal lines with respect to the x-axis basic line and the location of the position marks;

means for locating said data regions within said data field from the calculated locations of the points of intersection of the x and y axis internal lines at the time of reading; and means for reading the digital data within said data regions;

whereby optical and physical distortions of the locations of the x and y axis basic lines, corner mark and position marks are compensated for at the time of reading the data in order to accurately locate positions of the data regions within the data field.

16. The system of claim 15, said means for defining the data field further providing an X-axis external line and a Y-axis external line disposed on the opposite side of the data field from said X-axis and y-axis intersecting basic lines, respectively, for further defining the data field therebetween.

17. A method for locating and reading digital data in data regions within a data field on a surface and compensating for optical or physical distortions of the data field viewed by an optical reader, comprising the steps of:

defining the data field by providing x-axis and y-axis intersecting basic lines disposed at a predetermined angle with respect to each other and a corner mark on said surface, the corner mark together with the basic lines defining a data field therebetween;

marking predetermined distances between a plurality of imaginary x and y axis internal lines within said data field with position marks, said position marks being provided on said surface;

defining the positions of a plurality of imaginary x-axis internal lines within said data field, said x-axis internal lines being spaced at predetermined distances from each other defined by the position marks, said x-axis internal lines being disposed at predetermined angles with respect to said y-axis basic line;

defining the positions of a plurality of imaginary y-axis internal lines within said data field, said y-axis internal lines being spaced at predetermined distances from each other defined by said position marks, said y-axis internal lines being disposed at predetermined angles with respect to said x-axis basic line;

calculating the location of the points of intersection of the imaginary x and y axis internal lines at the time of reading said data from the angle between the x and y axis basic lines, the angles of the x-axis internal lines with respect to the y-axis basic line, the angles of the y-axis internal lines with respect to the x-axis basic line and the location of the position marks;

locating said data regions within said data field from the calculated locations of the points of intersection of the x and y axis internal lines at the time of reading; and reading the digital data within said data regions;

whereby optical and physical distortions of the locations of the x and y axis basic lines, corner mark and position marks are compensated for at the time of reading the data in order to accurately locate positions of the data regions within the data field.

18. The method of claim 17, wherein the step of defining the data field further includes providing an X-axis external line and a Y-axis external line disposed on the opposite side of the data field from said X-axis and Y-axis intersecting basic lines, respectively, for further defining the data field therebetween.

* * * * *